United States Patent
Haws et al.

(12)

(10) Patent No.: US 10,699,298 B2
(45) Date of Patent: Jun. 30, 2020

(54) METHOD AND SYSTEM FOR SELECTING A HIGHEST VALUE DIGITAL CONTENT

(71) Applicant: Digital Turbine, Inc., Austin, TX (US)

(72) Inventors: John Haws, Durham, NC (US); Yohan Lejosne, Boston, MA (US); William Lefew, Cary, NC (US)

(73) Assignee: Digital Turbine, Inc., Austin, TX (US)

( * ) Notice: Subject to any disclaimer, the term of this patent is extended or adjusted under 35 U.S.C. 154(b) by 550 days.

(21) Appl. No.: 15/482,770

(22) Filed: Apr. 9, 2017

(65) Prior Publication Data
US 2018/0293613 A1 Oct. 11, 2018

(51) Int. Cl.
*G06Q 30/02* (2012.01)
*G06F 7/16* (2006.01)

(52) U.S. Cl.
CPC .......... *G06Q 30/0254* (2013.01); *G06F 7/16* (2013.01); *G06Q 30/0242* (2013.01); *G06Q 30/0244* (2013.01); *G06Q 30/0246* (2013.01); *G06Q 30/0255* (2013.01); *G06Q 30/0269* (2013.01)

(58) Field of Classification Search
CPC .......... G06Q 30/0242; G06Q 30/0244; G06Q 30/0246; G06Q 30/0254; G06Q 30/0255; G06Q 30/0269
See application file for complete search history.

(56) References Cited

U.S. PATENT DOCUMENTS

| 2002/0002408 A1* | 1/2002 | Kobayashi | G06Q 10/00 700/29 |
| 2008/0281627 A1* | 11/2008 | Chang | G06Q 10/06375 705/7.39 |
| 2014/0046754 A1* | 2/2014 | Lee | G06Q 30/0242 705/14.41 |

(Continued)

OTHER PUBLICATIONS

Y. Leon Maksoudian, "A Triangular-Distribution Approximation of the Areas Under the Unit Normal Curve", 1963, The Journal of Experimental Education, vol. 31—Issue 4, pp. 355-356, Published Online: Jan. 29, 2015: "www.tandfonline.com/doi/abs/10.1080/00220973.1963.11010790?journalC" (Year: 2015).*

(Continued)

*Primary Examiner* — Arthur Duran
*Assistant Examiner* — Jonathan J Whitaker

(57) ABSTRACT

A computer-implemented method for selecting a digital content, comprising: receiving a plurality of samples, each comprises a request having a plurality of values of a plurality of attributes, and associated with a success value for a Bernoulli distributed event having a campaign and a bid rate (BR) of the campaign; clustering the plurality of samples in a plurality of homogenous nodes according to respective plurality of values; identifying a group campaign with a highest valuation for each one of the plurality of nodes using triangular approximation of the Bernoulli distribution of events in the node; receiving a query from a device including a plurality of other values of the plurality of attributes; selecting one of the plurality of nodes; selecting a digital (Continued)

content of the group campaign with highest valuation identified for the selected node; and generating a response to the query including the selected content.

19 Claims, 9 Drawing Sheets

(56) References Cited

U.S. PATENT DOCUMENTS

| | | | |
|---|---|---|---|
| 2014/0172871 A1* | 6/2014 | Brayman | G06F 16/2272 707/741 |
| 2016/0350802 A1* | 12/2016 | Mehanian | G06Q 30/0254 |
| 2017/0098240 A1* | 4/2017 | Yang | G06Q 30/0254 |
| 2018/0225711 A1* | 8/2018 | Murugesan | G06Q 30/0272 |

OTHER PUBLICATIONS

Ayman Farahat, "How Effective is Targeted Advertising?", Apr. 16, 20212, "https://www2012.universite-lyon.fr/proceedings/proceedings/p111.pdf" (Year: 2012).*

* cited by examiner

METHOD AND SYSTEM FOR SELECTING A HIGHEST VALUE DIGITAL CONTENT

FIELD AND BACKGROUND OF THE INVENTION

The present invention, in some embodiments thereof, relates to a system for selecting a digital content with highest valuation and, more specifically, but not exclusively, to selecting an advertisement from an advertisement campaign with highest valuation.

There may be the need to serve digital content to a device running a software application or a web site requesting digital content to display or play on the device. Examples of digital content are a text file, a file containing an image in digital format such as Joint Photographic Experts Group (JPEG) or Portable Network Graphics (PNG) and a file containing video data in a digital format such as Moving Picture Experts Group 4 (MPEG-4) and Audio Video Interleaved (AVI).

It may be the case that serving a digital content to a device may result in a user performing an expected action such as installing other software or clicking on a certain location on a web site. There may be a positive value associated with a user taking the expected action. In some cases there may be a plurality of possible digital content that may be served to the device, and there may be the need to choose a digital content from the plurality of possible digital content with the goal of achieving a highest valuation result.

SUMMARY OF THE INVENTION

It is an object of the present invention to provide a system and a method for monitoring presence(s) and/or action(s) of person(s) on premises and reacting to person related events such as predetermined audio events.

The foregoing and other objects are achieved by the features of the independent claims. Further implementation forms are apparent from the dependent claims, the description and the figures.

According to a first aspect of the invention, a computer-implemented method for selecting a digital content comprises: receiving a plurality of samples, each comprises a request having a plurality of values of a plurality of attributes describing structural or functional properties of a device, the sample associated with a success value for a Bernoulli distributed user action event having a campaign having one or more digital content, and a bid rate (BR) of the campaign; clustering the plurality of samples in a plurality of homogenous sample groups according to respective plurality of values; identifying a group campaign with a highest valuation for each one of the plurality of sample groups using triangular approximation of the Bernoulli distribution of user action events in the sample group; receiving a query from a device including a plurality of other values of the plurality of attributes describing structural or functional properties of the device; selecting one of the plurality of sample groups; selecting a digital content of the group campaign with highest valuation identified for the selected sample group; and generating a response to the query including the selected content. The plurality of other values includes at least one certain value for one certain attribute describing a property of the device and the selected sample group has a sample having the certain value of the certain attribute describing the property of another device. Using triangular approximation of a Bernoulli distribution improves the efficiency of calculations. Clustering samples into homogenous groups and selecting a digital content from a group with samples similar to the request improves the accuracy of the selection.

According to a second aspect of the invention, a software program product for selecting a digital content comprises: a non-transitory computer readable storage medium; first program instructions for receiving a plurality of samples, each comprises a request having a plurality of values of a plurality of attributes describing structural or functional properties of a device, the sample associated with a success value for a Bernoulli distributed user action event having a campaign having one or more digital content, and a bid rate (BR) of the campaign; second program instructions for clustering the plurality of samples in a plurality of homogenous sample groups according to respective plurality of values; third program instructions for identifying a group campaign with a highest valuation for each one of the plurality of sample groups using triangular approximation of the Bernoulli distribution of user action events in the sample group; fourth program instructions for receiving a query from a device including a plurality of other values of the plurality of attributes describing structural or functional properties of the device; fifth program instructions for selecting one of the plurality of sample groups; sixth program instructions for selecting a digital content of the group campaign with highest valuation identified for the selected sample group; and seventh program instructions for generating a response to the query including the selected digital content. The plurality of other values includes at least one certain value for one certain attribute describing a property of the device and the selected sample group has a sample having the certain value of the certain attribute describing the property of another device. The first, second, third, fourth, fifth, sixth and seventh program instructions are executed by at least one computerized processor from the non-transitory computer readable storage medium.

According to a third aspect of the invention, a system for selecting a digital content, comprises: at least one code storage storing a code; and at least one hardware processor coupled to the at least one code storage. The at least one hardware processor is coupled to the at least one code storage for executing the code for: receiving a plurality of samples, each comprises a request having a plurality of values of a plurality of attributes describing structural or functional properties of a device, the sample associated with a success value for a Bernoulli distributed user action event having a campaign having one or more digital contents, and a bid rate (BR) of the campaign; clustering the plurality of samples in a plurality of homogenous sample groups according to respective plurality of values; identifying a group campaign with a highest valuation for each one of the plurality of sample groups using triangular approximation of the Bernoulli distribution of user action events in the sample group; receiving a query from a device including a plurality of other values of the plurality of attributes describing structural or functional properties of the device; selecting one of the plurality of sample groups; selecting a digital content of the group campaign with highest valuation identified for the selected sample group; and generating a response to the query including the selected content. The plurality of other values includes at least one certain value for one certain attribute describing a property of the device and the selected sample group has a sample having the certain value of the certain attribute describing the property of another device.

With reference to the first, second and third aspects, in a first possible implementation of the first, second and third aspects of the present invention, the digital content is an advertisement for the purpose of displaying or playing the advertisement on the device. The plurality of attributes are members of a group including: an identifier identifying a software application or web site running on said device, a country where said device is located, an identifier of an operating system running on said device, an operating system version identifier, a size of advertisement requested, a make of said device, a model of said device, a network connection type, a gender of a user, and a city where said device is located. The user action event is a member of a group including: a user clicking on a certain location in the software application or web site and the user installing another software. Using the present invention in an advertisement server allows cost-efficient computations for generating increased return on investment for advertisement campaigns.

With reference to the first, second and third aspects, in a second possible implementation of the first, second and third aspects of the present invention, identifying a group campaign with a highest valuation comprises: generating a list of samples comprising all samples clustered in the sample group; generating a list of events comprising all Bernoulli distributed user action events associated with the list of samples; assuming for each one event in the list of events a conversion rate of the event in the list of samples (CVR); producing a plurality of valuations by calculating for each one event in the list of events a valuation in the list of samples (EV), identifying a highest valuation of the plurality of valuations in the list of samples ($EV_{best}$); producing a plurality of probabilistic scores by calculating a probabilistic score ($P_i$) for each one event in the list of events; identifying a highest probabilistic score of the plurality of probabilistic scores; choosing the campaign of the one event associated with the highest probabilistic score; and associating the chosen campaign with the sample group. Calculating for each one event in the list of events a valuation in the list of samples (EV) comprises: using a confidence level ($\tau$); applying numerical methods to find a possible conversion rate ($\theta$) such that the probability that CVR is greater than or equal to $\theta$ is equal to $\tau$; and multiplying $\theta$ by the campaign's BR to compute EV. Calculating a probabilistic score ($P_i$) for each one event in the list of events, comprises: calculating a probability that EV is greater than $EV_{best}$ by using triangular approximation of the Bernoulli distribution of the one event in the list of events; and associating $P_i$ with the one event. First computing an evaluation for every event and then computing a probabilistic score for every event using a triangular approximation of the event's Bernoulli distribution is an efficient method for computing a probabilistic score.

With reference to the first, second and third aspects, or the second possible implementation of the first, second and third aspects, in a third possible implementation of the first, second and third aspects of the present invention, using triangular approximation of the Bernoulli distribution of the one event in the list of events comprises using an isosceles triangle centered around $EV_{best}$, and having a base equaling four times the standard deviation of the distribution of the event and a height equaling the inverse of two times the standard deviation of the distribution of the event. A triangle with these proportions captures approximately 95% (ninety-five percent) of the area under the curve representing the Bernoulli distribution function of the one event.

With reference to the first, second and third aspects, or the second and third possible implementations of the first, second and third aspects, in a fourth possible implementation of the first, second and third aspects of the present invention, numerical methods include using a numerical solver. Using a numerical solver for applying numerical method is a simple and cost effective way to apply numerical methods.

With reference to the first, second and third aspects, in a fifth possible implementation of the first, second and third aspects of the present invention, clustering the plurality of samples in a plurality of homogenous sample groups according to respective plurality of values comprises for each one of the plurality of samples: choosing another at least one certain value of another at least one certain attribute describing a property of a device of the plurality of values; selecting one of the plurality of sample groups, having another of the plurality of samples having the other at least one certain value of the other at least one certain attribute describing the property of another device; and adding the sample to the selected sample group. Using sample attributes for clustering the samples creates homogenous sample groups and raises the probability of selecting a high value campaign.

With reference to the first, second and third aspects, in a sixth possible implementation of the first, second and third aspects of the present invention, the method further comprises storing the plurality of sample groups in a storage. Storing the sample groups in storage allows retrieving values computed for the storage groups without the need to repeat computations.

With reference to the first, second and third aspects, or the sixth possible implementation of the first, second and third aspects, in a seventh possible implementation of the first, second and third aspects of the present invention, the storage is at least one database. The at least one database is a member of a group including: a local database and a remote database. Using a database allows efficient storage and retrieval of values. Using a local database reduces cost. Using a remote database allows multiple processors to share a common database.

With reference to the first, second and third aspects, in an eighth possible implementation of the first, second and third aspects of the present invention, the method further comprises: receiving another sample comprising a plurality of third values of the plurality of attributes describing the properties of a third device and associated with another success value for another Bernoulli distributed user action event, having a second campaign having one or more other digital content, and a second bid rate ($BR_i$) of the second campaign; selecting another of the plurality of sample groups; adding the other sample to the other sample group; and identifying a new group campaign with a highest valuation using triangular approximation of the Bernoulli distribution of user action events in the other sample group. Adding new samples improves the accuracy of the estimations. Adding a new sample only to sample groups it is similar to improve the efficiency of computations by eliminating some of the valueless computations.

With reference to the first, second and third aspects, or the eighth possible implementation of the first, second and third aspects, in a ninth possible implementation of the first, second and third aspects of the present invention, identifying a new campaign with a highest valuation using triangular approximation of the Bernoulli distribution of user action events in the other sample group comprises: generating a new list of samples comprising all samples clustered in the other sample group; generating a new list of events comprising all Bernoulli distributed user action events associated with the new list of samples; assuming for each one event in the new list of events a conversion rate of the one event in the new list of samples ($CVR_{new}$); producing a plurality of new valuations by calculating for each one event in the new list of events a new valuation in the new list of samples ($EV_{new}$); identifying a new highest valuation of the plurality of new valuations in the new list of samples ($EV_{newbest}$); producing a plurality of new probabilistic scores by calculating a new probabilistic score ($P_{inew}$) for each one other event in said new list of events; identifying a new highest probabilistic score of the new plurality of probabilistic scores; choosing the second campaign of the one other event associated with the new highest probabilistic score; and associating the chosen second campaign with said other sample group. Calculating for each one event in the new list of events a new valuation in the new list of samples ($EV_{new}$) comprises: using another confidence level ($\tau_{new}$); applying numerical methods to find a new possible conversion rate ($\theta_{new}$) such that the probability that $CVR_{new}$ is greater than or equal to $\theta_{new}$ is equal to $\tau_{new}$; and multiplying $\theta_{new}$ by the second campaign's second bid rate $BR_j$. Calculating a new probabilistic score ($P_{inew}$) for each one other event in the new list of events, comprises: calculating a new probability that $EV_{new}$ is greater than $EV_{newbest}$ by using triangular approximation of the Bernoulli distribution of the one other event in the new list of events; and associating $P_{inew}$ with the one other event.

With reference to the first, second and third aspects, or the eighth and ninth possible implementations of the first, second and third aspects, in a tenth possible implementation of the first, second and third aspects of the present invention, the numerical methods include using a numerical solver.

With reference to the first, second and third aspects, in an eleventh possible implementation of the first, second and third aspects of the present invention, receiving a plurality of samples is by reading the plurality of samples from the code storage. Using the same storage for storing code and samples eliminates the cost of adding other storage to the system.

With reference to the first, second and third aspects, in a twelfth possible implementation of the first, second and third aspects of the present invention, receiving a plurality of samples is via a network. Using a network allows decoupling the processor computing the valuations from other components of the system handling sample collection.

With reference to the first, second and third aspects, in a thirteenth possible implementation of the first, second and third aspects of the present invention, the system further comprises a local digital memory hardware electrically coupled to the at least one hardware processor. Receiving a plurality of samples is by reading the plurality of samples from the local digital memory hardware.

With reference to the first, second and third aspects, in a fourteenth possible implementation of the first, second and third aspects of the present invention, the system further comprises a remote storage, connected to the at least one hardware processor via a network. Receiving a plurality of samples is by reading the plurality of samples from the remote storage.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, a technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
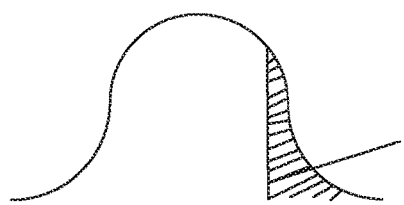
FIGS. 1A, 1B and 1C are schematic illustrations of graphical representations of a possible Bernoulli distribution function of a user action event's success values in a sample group and of an optional triangular approximation of the possible Bernoulli distribution function, according to some embodiments of the present invention.

The present invention, in some embodiments thereof, relates to a system for selecting a digital content with highest valuation and, more specifically, but not exclusively, to selecting an advertisement for an advertisement campaign with highest valuation.

There may be the need to serve digital content such as a file containing text, a digital image or video data to a device running a software application or a web site requesting digital content to display or play on the device.

It may be the case that serving a digital content to a device may result in a user performing an expected action such as installing other software or clicking on a certain location on a web site after viewing the served digital content. There may be a positive value associated with a user performing the expected action. This expected user action is referred to as the digital content's "user action event". When a digital content is associated with a campaign, this expected user action is considered the campaign's user action event. When a user performs the expected action after viewing the served digital content, the user action event is considered successful. The user action event is considered a failure when the user does not perform the expected action after viewing the served digital content.

There may be the need to choose a digital content from a plurality of possible digital content with the goal of achieving a highest valuation result. When historical samples are available, each sample comprising a digital content and the result after serving it, statistical methods may be applied using the results of historical samples to calculate the probability that serving a certain digital content will result in a successful user action event. Other statistical methods may be used to choose a digital content with the highest probability of producing a result with a highest valuation.

Typically, such statistical methods include numerical integration for computing an area under a curve. These methods typically have slow performance. Also, in systems where the historical data comprises a large number of samples but few successful results, the distribution of the results may be instable over time.

To overcome these problems in applying the statistical methods, the present invention in some embodiments thereof replaces the numeric integration under a curve with a calculation of the area of a triangle, which is a simple and fast calculation having less computational complexity than numeric integration under a curve. The replacement may be done by substituting the true curve representing a probability density function with a triangular approximation of the true curve. Calculating the area of a triangle is faster than performing a numeric integration under a curve, improving the efficiency of computing a valuation, reducing power consumption and mitigating latency incurred by computation time.

In some embodiments, the present invention may cluster historical samples into homogenous sample groups having matching valued attributes describing structural or functional properties of a device from which a request is made for digital content. In some embodiments, two values for an attribute may match when they are equal. In other embodiments, two values for an attribute may match when they are sufficiently similar, for example differ only in a certain number of least significant digits or characters, or are both members of a predefined group of values for the attribute. When choosing a best digital content, statistical methods are applied only to a subset of the historical samples clustered in one sample group, reducing the time and cost of calculation due to the smaller number of samples used in the calculation and reducing the instability in distribution of results because of the homogenous qualities of the sample group used for the calculation.

A valuation based on a plurality of recent homogenous samples is expected to be more accurate than a valuation based on a plurality of old samples or heterogeneous samples. As new historical samples are collected, there is a need to update a plurality of valuations in a timely manner. A slight improvement (for example 5% or 10% time improvement) in a speed of calculating one valuation is aggregated in a system where there is a need to calculate a large amount of valuations, for example hundreds or thousands of valuations, in a short period of time, for example a period of one minute. Calculating a plurality of valuations using the present invention in some embodiments thereof is faster, thus consumes less power, than calculating the plurality of valuations using numeric integration under a curve, enabling frequent and timely updates of the valuations with less latency than when using numeric integration under a curve. In addition, calculating a plurality of valuations using the present invention in some embodiments thereof provides a plurality of valuations more accurate than a plurality of valuations calculated using heterogeneous samples. These advantages allow serving over time a plurality of digital content with higher probabilities of producing a result with a highest valuation than when using numeric integration under a curve and/or heterogeneous samples in the computation of the plurality of valuations.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following description focuses on embodiments where the present invention is used for serving advertisements in a digital format from an advertisement serving system (henceforth referred to as an ad server) to a device running a software application or web site and requesting an advertisement from the ad server to display on the device. However, the present invention is not limited to such embodiments. Examples of other uses are serving content recommendations, for example recommendations for applications, books or video content, and serving study exercises in a computerized learning system.

The present invention, in some embodiments thereof, allows for fast identification of a digital content with highest valuation from a plurality of digital contents, in response to a query from a device asking for a digital content with highest valuation. In some embodiments the present invention may be used to choose an advertisement campaign from a plurality of advertisement campaigns. In such embodiments, the present invention is used to identify an advertisement campaign with a highest likelihood of resulting in a user action event that is beneficial to an advertiser. For example, the goal of serving an advertisement for a certain campaign may be for a user viewing the advertisement to act, for example by clicking on a certain location or installing a certain software. In such embodiments serving the digital content of an advertisement from a certain campaign creates an opportunity for the advertisement to be viewed by a user, henceforth referred to as an impression. The impression may result in the advertisement's user action event of the user clicking on the certain location or installing the certain software. When a user clicks on the certain location or installs the certain software after the impression, the advertisement's user action event has a success value of TRUE and is considered successful. When a user does not click on the certain location or install the certain software after the impression, the campaign's user action event has a success value of FALSE and is considered failure. The success value of the event may be associated with the advertisement and with the campaign. The distribution of the success values of the user action event in all impressions of the campaign is a Bernoulli distribution.

The term "campaign" is used henceforth to describe a plurality of digital content sharing a single theme. Examples of a theme are a source of the plurality of digital content and a subject matter of the plurality of digital content. A bid rate is a value associated with a campaign having at least one digital content. In some embodiments the bid rate may be a value associated with an advertisement campaign. The bid rate of one campaign may be different from the bid rate of another campaign. In some embodiments, the goal of an ad server may be to generate a highest accumulated value from the campaigns served by the ad server. Thus, when the ad server receives a query from a device running a software application or web site for an advertisement, there is a need to identify a campaign with a highest probability of generating a highest value. In some embodiments, a valuation of a campaign is given by a probability that an impression of the campaign will result in a user clicking on a certain location or installing a certain software, multiplied by the bid rate of the campaign.

In some embodiments of the present invention, information about a plurality of historical samples is collected. A historical sample may include a request for an advertisement having values of attributes describing structural or functional properties of a device from which the request was made, an impression and a success value of the impression's user action event following the impression. Optionally, the request has values for contextual attributes describing the context in which the request was sent, for example a geographical location of the device, a gender of a user using the device and time of day the request was made. The impression is the advertisement campaign served. The success value is TRUE if a user clicked on a certain location in a software application or installed another software following the impression, FALSE otherwise.

When an ad server receives a request for an advertisement, a plurality of advertisement campaigns may be eligible. In order to facilitate faster calculations to identify a campaign with the highest value, in some embodiments of the present invention the historical samples are clustered into a plurality of homogenous sample groups. For brevity, henceforth the term "node" refers to a homogenous sample group of historical samples. Optionally, the nodes are created such that all samples in one node have matching values for one or more of a plurality of attributes of the device requesting the advertisement, selected from a group including but not limited to: an identifier identifying an application or web site making a request, a country from which a request is made, a platform type for example iOS or Android, an operating system version identifier, a size of advertisement requested, a make of a device, a model of a device, a connection type for example WiFi, $3^{rd}$ generation cellular and $4^{th}$ generation, a gender of a user and a city.

For each campaign of the plurality of campaigns, there is a need to estimate on each node of the plurality of nodes a probability that an impression of the campaign will result in a user clicking on a certain location or installing a certain software, based on the historical samples in the node. Historical measured conversion rates of the success values of a user action event on a node may be used as an estimate for the probability of a conversion of the campaign's user action event on the node. However, because campaigns have varying amounts of historical samples, a more meaningful estimate of a campaign's conversion rate on a node is a probabilistic conversion rate on the node at a certain predefined confidence level.

On a node, a plurality of probabilistic conversion rates may be calculated by calculating a probabilistic conversion rate on the node for each campaign of the plurality of campaigns. In some embodiments, a plurality of estimated valuations is calculated by multiplying for each campaign of the plurality of campaigns the campaign's calculated probabilistic conversion rate by the campaign's bid rate. A maximum estimated valuation may be identified on the node from the plurality of estimated valuations.

Now, for each campaign of the plurality of campaigns a probability that the campaign's estimated valuation is greater or equal the maximum estimated valuation on the node may be calculated. This is the campaign's probabilistic score. This calculation typically involves numerical integration under a curve of a Bernoulli distribution function. In some embodiments of the present invention, the numerical integration under a curve is replaced by the calculation of the area under a triangle, which is a simpler and faster calculation. In such embodiments, a triangular approximation of the Bernoulli distribution function of the user action event's success values on the node may be used instead of the Bernoulli distribution function.

Of the plurality of probabilistic scores, a maximum probabilistic score may be identified and the campaign associated with the maximum probabilistic score may be selected as the node's highest valuation campaign. An advertisement from the selected highest valuation campaign may be selected as the highest valuation content of the node.

Henceforth for brevity, the term "campaign's conversion rate" means "campaign's user action event's conversion rate", and "campaign's probability of conversion" mean's "campaign's user action event's probability of conversion".

For a certain campaign i, historical samples in a certain node may include the number of impression for the campaign on the node ($n_i$) and the number of successes on the node ($y_i$), where success may be a user clicking on a location or a user installing a certain software. The campaign also has a bid rate ($BR_i$) and a probability of conversion on the node (historical conversion rate of the Bernoulli distribution of the campaign's user action event on the node, $CVR_i$). In most cases the true value of $CVR_i$ is unknown. The historical measured conversion rate for the campaign on the node is the ratio of the number of impressions on the node and the number of successes on the node:

$$HMCR_i = y_i/n_i$$

Historical measured conversion rate may be used as an estimate for the probability of a conversion on the node, and thus for calculating an estimate of a campaign's valuation on the node ($HEV_i$):

$$HEV_i = HMCR_i * BR_i$$

However, because campaigns have varying amounts of historical samples, a more accurate estimate of a campaign's conversion on a node is a probabilistic conversion. According to some embodiments of the present invention, numerical methods are used to calculate for each campaign i an estimated conversion rate on the node ($\theta_i$) such that the historical conversion rate on the node is greater than or equal to the calculated conversion rate on the node at a certain predefined confidence level ($\tau$):

$$P(CVR_i \geq \theta_i | n_i, y_i) = \tau$$

Optionally, $\tau$ may equal 0.5 (half).

For every campaign, the campaign's estimated valuation on the node $EV_i$ may be the product of the campaign's estimated conversion rate $\theta_i$ and the campaign's bid rate:

$$EV_i = \theta_i * BR_i$$

On a given node, there may be a campaign whose estimated valuation ($EV_{best}$) is greater than the estimated valuation of all other campaigns on the node: $EV_{best} = \max(EV_i)$.

Now, for every campaign i a probability $P_i$ may be calculated, where:

$$P_i = P(EV_i \geq EV_{best} | n_i, y_i)$$

For every campaign i, $P_i$ is a probabilistic score associated with the campaign. In some embodiments having a plurality of campaigns, the plurality of campaigns is sorted by probabilistic score. In some embodiments the campaign's probabilistic score and estimated valuation are used in selecting a campaign with highest valuation.

When the ad server receives a request from a device for an advertisement, the ad server may select a node matching the request, and return an advertisement for campaign max, where on the selected node the valuation of campaign max has the highest probabilistic score: $P_{max} = \max(P_i)$.

The raw probabilistic scores provide a mix of exploration of campaigns with reasonable probabilities of having highest valuation and exploitation of campaigns already having highest valuation at the time of calculation. This mix is adequate when identifying a single digital content with highest valuation. However, in some embodiments the present invention may be used to identify a plurality of digital contents with highest valuation, for example when preloading an application on to a device. In such embodiments, there is a need to ensure that campaigns already having highest valuations are identified at a higher priority than campaigns with reasonable probabilities of having highest valuation. In some embodiments this is done by employing exponential diffusion of valuations. For example, a possible computation is to calculate for each campaign valuation $EV_i$ a diffused valuation:

$$\hat{P}_i = (P_i)^l / (P_{max})^l$$

where l is a relatively large exponent, for example 18.

Reference is now made to FIG. 1A, showing a schematic representation of a graphical representation of a possible Bernoulli distribution function of the estimated valuation of a campaign on a node. Typically, the graphical representation is a curve. Calculating the probability the true valuation for the campaign on the node is greater than $EV_{best}$, $P_i$, typically requires numerical integration for calculating the shaded area 1103 under the curve from $EV_{best}$ to 1 (one). This calculation is typically slow.

In some embodiments of the present invention, triangular approximation of the Bernoulli distribution function is used. Reference is also made to FIG. 1B, showing a possible triangular approximation 1102 of a possible curved Bernoulli distribution function 1101 of the estimated valuation of a campaign on a node. Optionally, the triangle is an isosceles triangle centered on $EV_{best}$, with a base four times the standard deviation of the distribution of the estimated valuation of the campaign's estimated valuation on the node and the height may be the inverse of two times the standard deviation of the distribution of the campaign's estimated valuation on the node. A triangle with these dimensions captures approximately 95% (ninety-five percent) of the area under the curve representing the Bernoulli distribution function and correlates to the use of the confidence level ($\tau$) in the calculations.

Figure 1C:
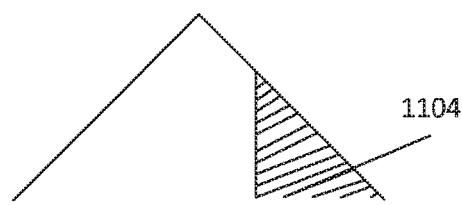
Figure 1B:
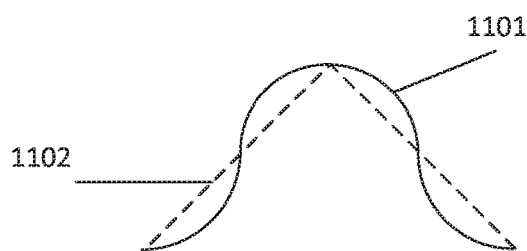

Reference is also made to FIG. 1C, showing a possible graph representing triangular approximation of a possible curved Bernoulli distribution function of the campaign's estimated valuation on a node. The shaded area under the triangle 1104 from $EV_{best}$ to 1 (one) is an approximation of the probability the valuation is greater than $EV_{best}$. Calculating area 1104 is a simple calculation of the area of a triangle.

Figure 2:
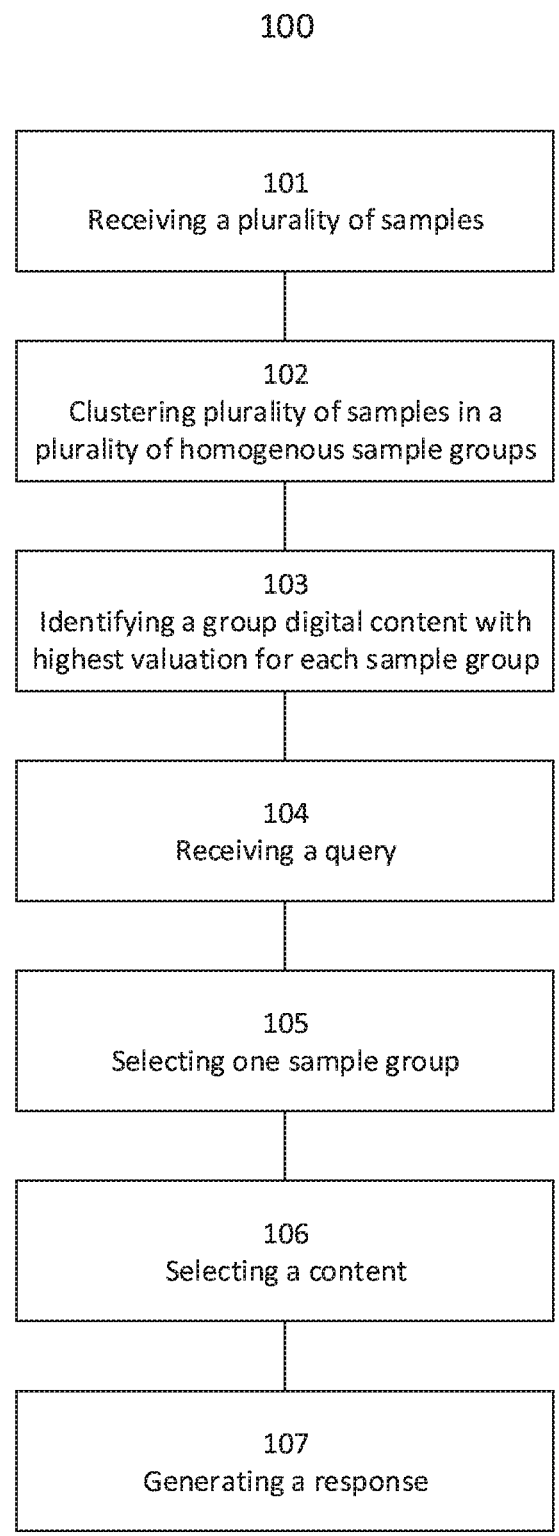
FIG. 2 is a sequence diagram of an optional flow of operations according to some embodiments of the present invention.

Reference is now made to FIG. 2, showing a sequence diagram of an optional flow of operations 100 according to some embodiments of the present invention. In such embodiments there is information about a plurality of historical samples. A historical sample may have a request from a device for digital content having a plurality of values of a plurality of attributes describing structural or functional properties of the device, and may be associated with a success value of a Bernoulli distributed user action event. The user action event may have a campaign and a bid rate. For example, in some embodiments, the request for digital content may be a request from a device running a software application or web site for an advertisement to display on the device. In such embodiments a user action event may be a user clicking on a certain location on an application or installing another software, and the success value is TRUE (success) if a user clicked on the certain location or installed the other software following the impression, FALSE (fail) otherwise. Optionally, the plurality of attributes describes structural or functional properties of the device sending the request for an advertisement.

Upon receiving information about a plurality of historical samples 101, in such embodiments the plurality of historical samples is clustered 102 in a plurality of homogenous sample groups (nodes). Optionally, the plurality of historical samples is clustered in a plurality of nodes such that all samples in a node have matching values for one or more of a plurality of attributes. For each of the plurality of nodes, a group campaign with highest probabilistic score $P_{max}$ is identified 103 by using triangular approximation of the Bernoulli distribution of campaigns's estimated valuations in the node. Upon receiving a query 104 having a plurality of other values of the plurality of attributes, in such embodiments one node is selected 105 such that samples on the selected node have matching values to the plurality of other values for the plurality of attributes. In some embodiments, two values for an attribute match when they are equal. In other embodiments, two values for the attribute match if they are sufficiently similar, for example differ only in a certain number of least significant digits or characters, or are both members of a predefined group of values for the attribute. In 106 a digital content of the previously identified group campaign with highest valuation $P_{max}$ is selected, and in 107 a response to the query is generated, including the selected digital content. In some embodiments of the current invention, the digital content is an advertisement for a campaign with a score equaling $P_{max}$.

Figure 3:
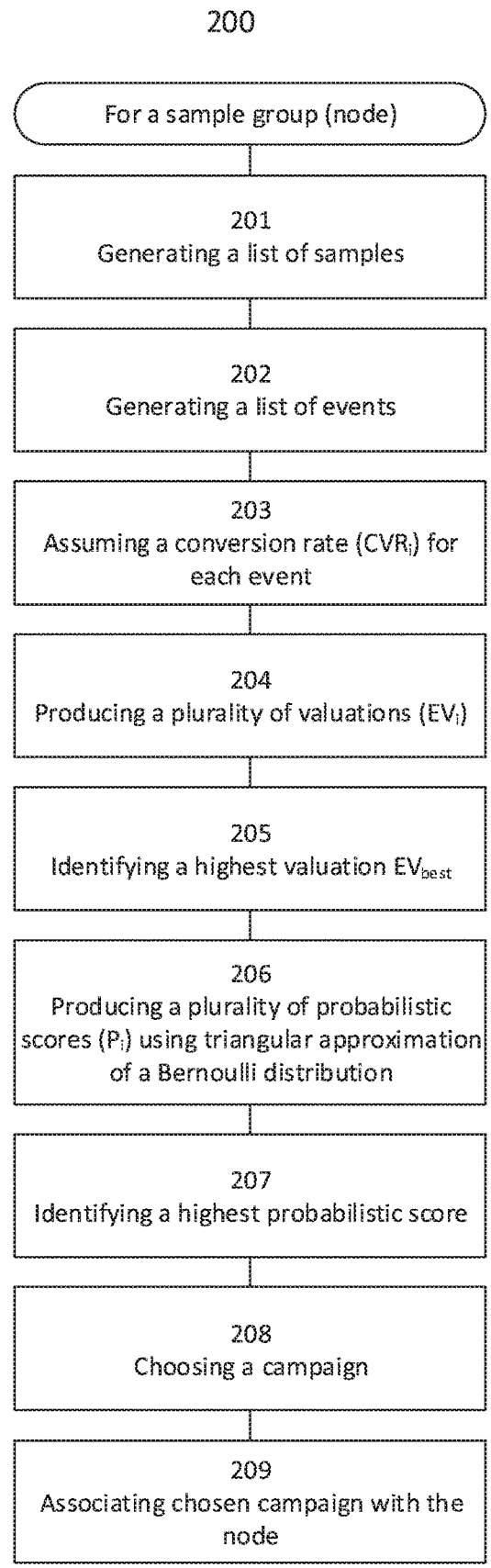
FIG. 3 is a sequence diagram of an optional flow of operations according to the present invention for identifying a group campaign with highest valuation for one sample group, according to some embodiments of the present invention.

Reference is now made to FIG. 3, showing a sequence diagram of an optional flow of operations 200 according to the present invention for identifying a group campaign with highest valuation for a node. In some embodiments of the present invention a list of the samples in the node is generated 201. Next a list of all campaigns' user action events in the samples on the node is generated 202. For each event in the list of all events, a conversion rate ($CVR_i$) is assumed 203. In such embodiments, a plurality of valuations is produced 204 by calculating for each event in the list of all events a valuation ($EV_i$). In such embodiments, a highest valuation $EV_{best}$ may be identified 205 such that $EV_{best}=\max(EV_i)$. In some embodiments, a plurality of probabilistic scores is produced 206 by calculating for each campaign a probabilistic score using triangular approximation of the Bernoulli distribution of the campaign's event in the node. A highest probabilistic score $P_{max}$ may be identified 207 from the plurality of probabilistic scores, and a campaign may be selected 208 such that the campaign's event has a probabilistic score equaling $P_{max}$. For example, in some embodiments the selected campaign is an advertisement campaign associated with the user action event having a probabilistic score equaling $P_{max}$. The selected campaign may be associated with the node as the node's group campaign with highest valuation 209.

The plurality of probabilistic scores in 206 may be produced by calculating for each event a probabilistic score using triangular approximation of the Bernoulli distribution of the event in the node. In some embodiments, a probability $P_i$ that the user action event's valuation $EV_i$ is greater than a previously identified highest valuation $EV_{best}$ is calculated using triangular approximation of the Bernoulli distribution of the event in the node. Optionally, the triangle is an isosceles triangle centered on $EV_{best}$, with a base four times the standard deviation of the distribution of the success values of the event in the node and the height is the inverse of two times the standard deviation of the distribution of the success values of the event in the node.

Figure 4:
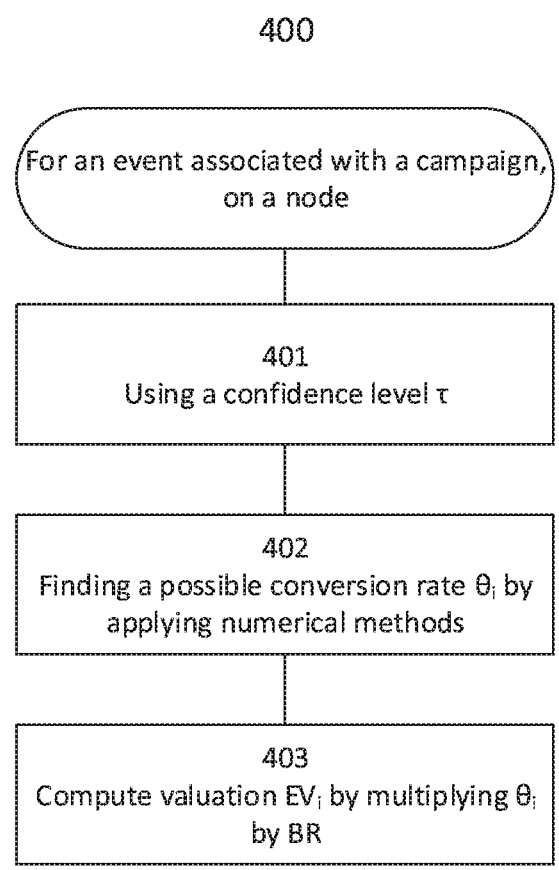
FIG. 4 is a sequence diagram of an optional flow of operations for producing a valuation for a user action event in a sample group, according to some embodiments of the present invention.

The plurality of valuations in 204 may be produced by calculating for each user action event in the list of all user action events a valuations ($EV_i$). Reference is now made to FIG. 4, showing a sequence diagram of an optional flow of operations 400 for producing a valuation for a campaign's user action event in a sample group (node), according to some embodiments of the present invention. In such embodiments, a confidence level τ is used 401. Optionally, the value of τ may be 0.5 (half). In other embodiments the confidence level may be higher by using a larger value for τ or lower by using a smaller value for τ. Numerical methods may be applied 402 to find a possible conversion rate $θ_i$ for the event, such that the probability that the event's assumed conversion rate $CVR_i$ is greater or equal to $θ_i$ is greater or equal to τ. In some embodiments, a numerical solver is used to apply the numerical methods. In some embodiments $θ_i$ is multiplied by the event's campaign's bid rate 403 to calculate a valuation for the event.

In some embodiments, information is collected about new samples. This information about new samples may be added to the plurality of historical samples. When a new sample is received, the new sample may be added to one or more matching nodes having samples with matching values attributes. Following the addition of the new sample to one or more matching nodes, a new group campaign with a highest valuation may be identified for the one or more matching nodes. Using triangular approximation of Bernoulli distributions for identifying the new group campaign allows fast identification of the new group campaign, thus allowing real time updates to be done faster than is possible using numerical integration methods.

Figure 5:
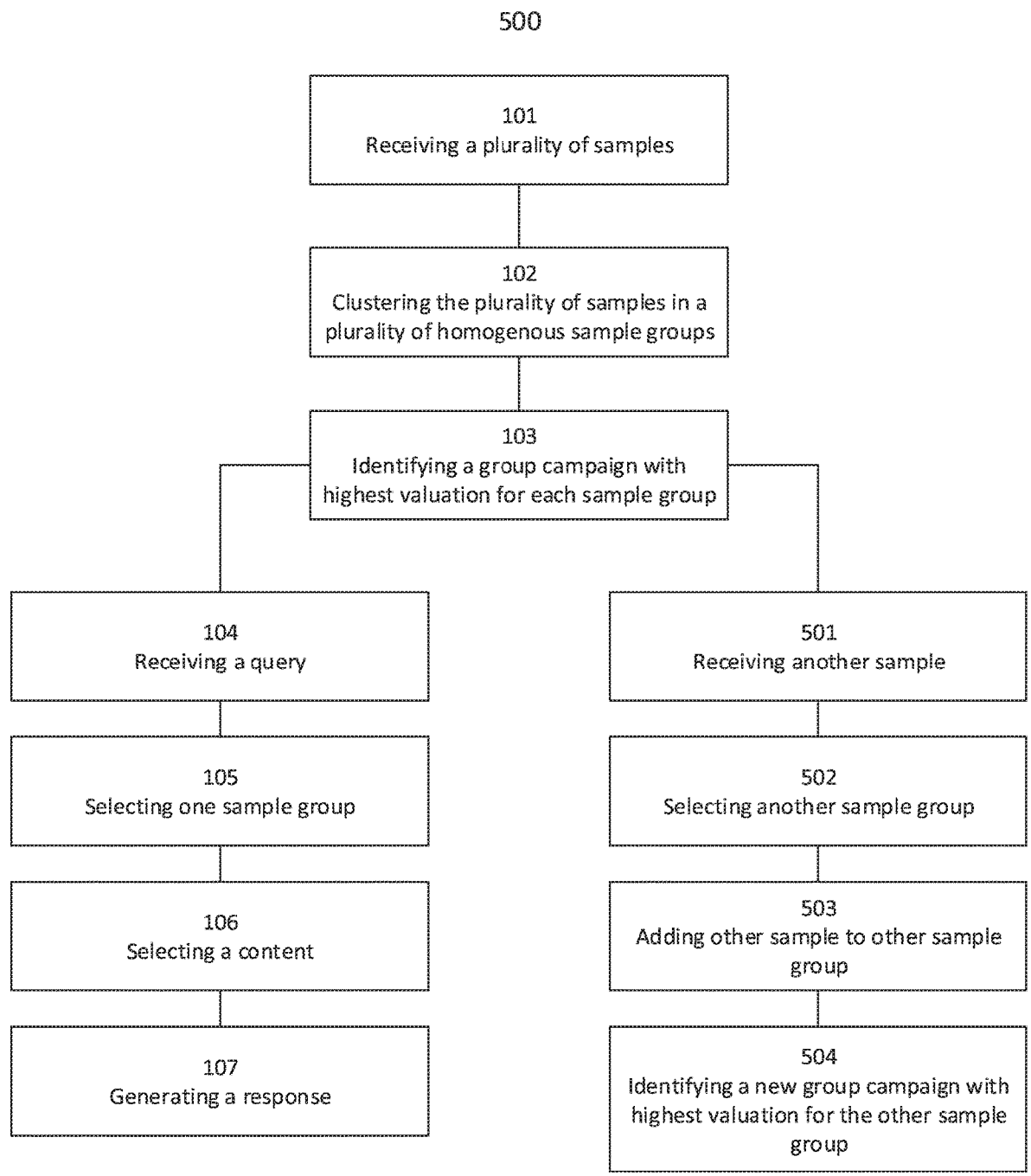
FIG. 5 is a sequence diagram of a second optional flow of operations including receiving a new sample, according to some embodiments of the present invention.

Reference is now made to FIG. 5, showing a sequence diagram of a second optional flow of operations 500, including receiving a new sample, according to some embodiments of the present invention. In such embodiments, a new sample is received 501, where the new sample has a request from a device for digital content having a plurality of third values of the plurality of attributes describing structural or functional properties of the device, and is associated with a success value of another Bernoulli distributed user action event. The other user action event may have another campaign and another bid rate. In such embodiments another node is selected 502 such that samples on the other node have matching values to the plurality of third values for the plurality of attributes. In some embodiments, two values for an attribute match if they are equal. In other embodiments, two values for the attribute match if they are sufficiently similar, for example differ only in a certain number of least significant digits or characters, or are both members of a predefined group of values for the attribute. The new sample may be added 503 to the other node, and then a new group campaign with highest valuation may be identified 504 for the other node after adding the new sample, using triangular approximation of the Bernoulli distribution of the events in the other node. In some embodiments the new sample is the first sample added to the other node. In other embodiments there are additional samples associated with the node before adding the new sample.

Figure 6:
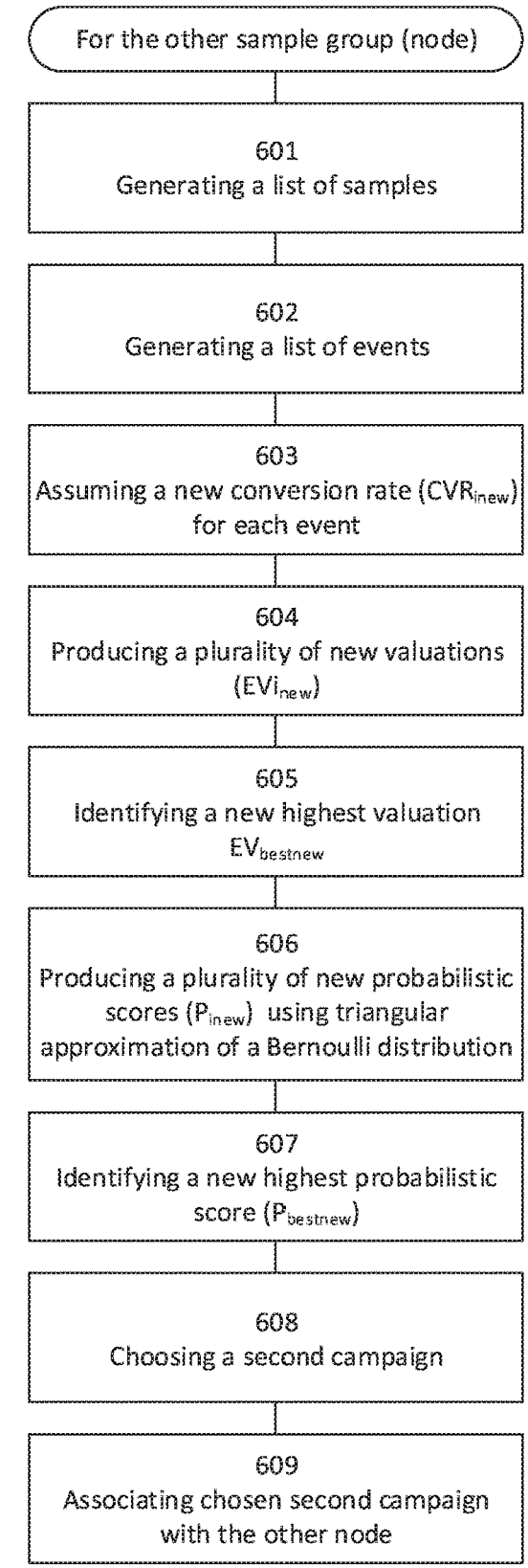
FIG. 6 is a sequence diagram of an optional flow of operations for identifying a new group campaign with highest valuation for one sample group after receiving a new sample, according to some embodiments of the present invention.

Reference is now made to FIG. 6, showing a sequence diagram of an optional flow of operations 600 for identifying a new group campaign with highest valuation for a node after receiving a new sample, according to some embodiments of the present invention. In such embodiments a new list of the samples in the node is generated 601. Next a new list of all campaign's user action events in the samples on the node is generated 602. For each event in the new list of all events, a new conversion rate ($CVR_{inew}$) may be assumed 603. In such embodiments, a new plurality of valuations is produced 604 by calculating for each event in the new list of all events a new valuation ($EV_{inew}$). In such embodiments, a new highest valuation $EV_{bestnew}$ may be identified 605 such that $EV_{newbest}=\max(EV_{inew})$. In some embodiments, a new plurality of probabilistic scores is produced 606 by calculating for each campaign's event a new probabilistic score using triangular approximation of the Bernoulli distribution of the campaign's event in the node. A highest probabilistic score $P_{newmax}$ may be identified 607 from the new plurality of probabilistic scores, and a second campaign may be selected 608 such that the new campaign's event has a probabilistic score equaling $P_{newmax}$. The selected second campaign may be associated with the node as the node's new group campaign with highest valuation 609.

Figure 7:
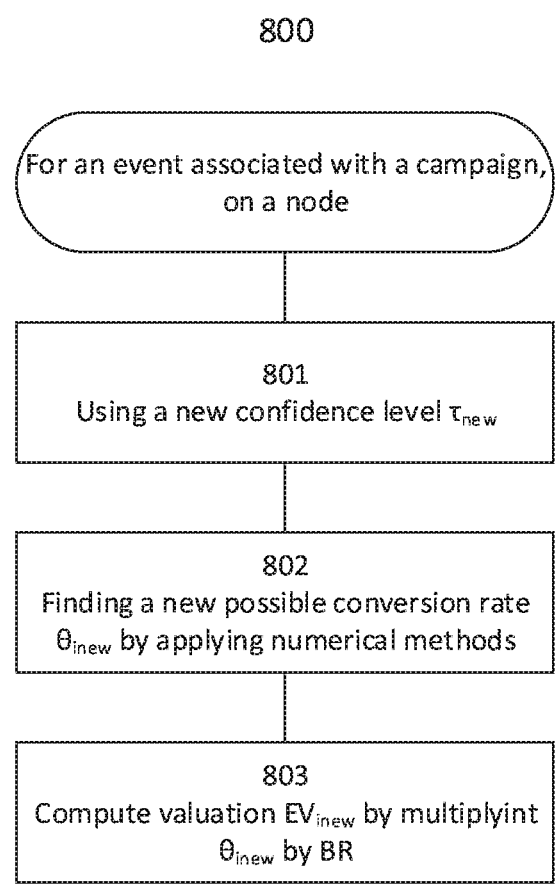
FIG. 7 is another sequence diagram of an optional flow of operations for producing a new valuation for a user action event in a sample group after receiving a new sample, according to some embodiments of the present invention.

Reference is now made to FIG. 7, showing another sequence diagram of an optional flow of operations for producing a new valuation for a campaign's event in a node after receiving a new sample, according to some embodiments of the present invention. In such embodiments, another confidence level $\tau_{new}$ is used 801. Numerical methods may be applied 802 to find a new possible conversion rate $\theta_{inew}$ for the event, such that the probability that the event's new assumed conversion rate $CVR_{inew}$ is greater or equal to $\theta_{inew}$ is greater or equal to $\tau_{new}$. In some embodiments, a numerical solver is used to apply the numerical methods. In some embodiments, $\theta_{inew}$ is multiplied by the event's campaign's bid rate 803 to calculate a valuation for the event.

Figure 8:
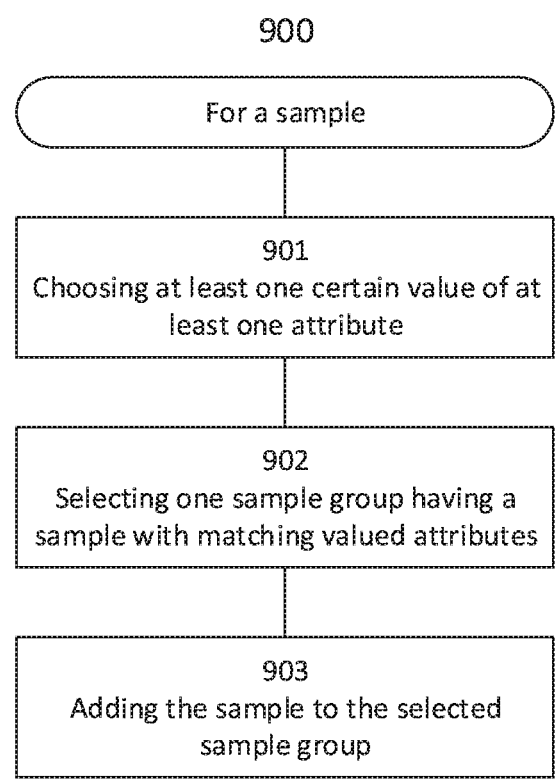
FIG. 8 is a sequence diagram of an optional flow of operations for clustering a plurality of samples in a plurality of sample groups, according to some embodiments of the present invention.

In embodiments where there is information about a plurality of historical samples, the historical samples may be clustered in a plurality of homogenous nodes, to be used in the identification of a group digital content with highest valuation. The homogenous quality of the nodes improves the accuracy of the valuation estimating the probability that serving the group digital content with highest valuation will result in a user clicking on a certain location or installing a certain software. Referring now to FIG. 8, showing a sequence diagram of an optional flow of operations 900 according to the present invention for clustering a plurality of samples in a plurality of nodes, according to some embodiments of the present invention. In some embodiments of the present invention, the clustering may be done such that samples in a node have at least one certain value for an attribute. For every sample of the plurality of historical samples, one certain value of at least one attribute is chosen 901. A node is selected 902 such that the selected node has another sample of the plurality of historical samples having the at least one certain value for the attribute. The sample is then added 903 to the selected node.

In some embodiments, historical samples may be limited to a predefined length of time, for example only samples from the past month or the past two weeks are used.

In some embodiments, the plurality of nodes may be stored in a storage. Examples of occasions when the plurality of nodes may be stored in the storage are after clustering, when a group digital content with highest valuation is identified for all nodes in the plurality of nodes, when a new sample is added to a node and when a new group digital content with highest valuation is identified for a node with a new sample. Optionally, the storage may be at least one database. In some embodiments the at least one database may be a local database. In other embodiments the at least one database may be a remote database.

Figure 9:
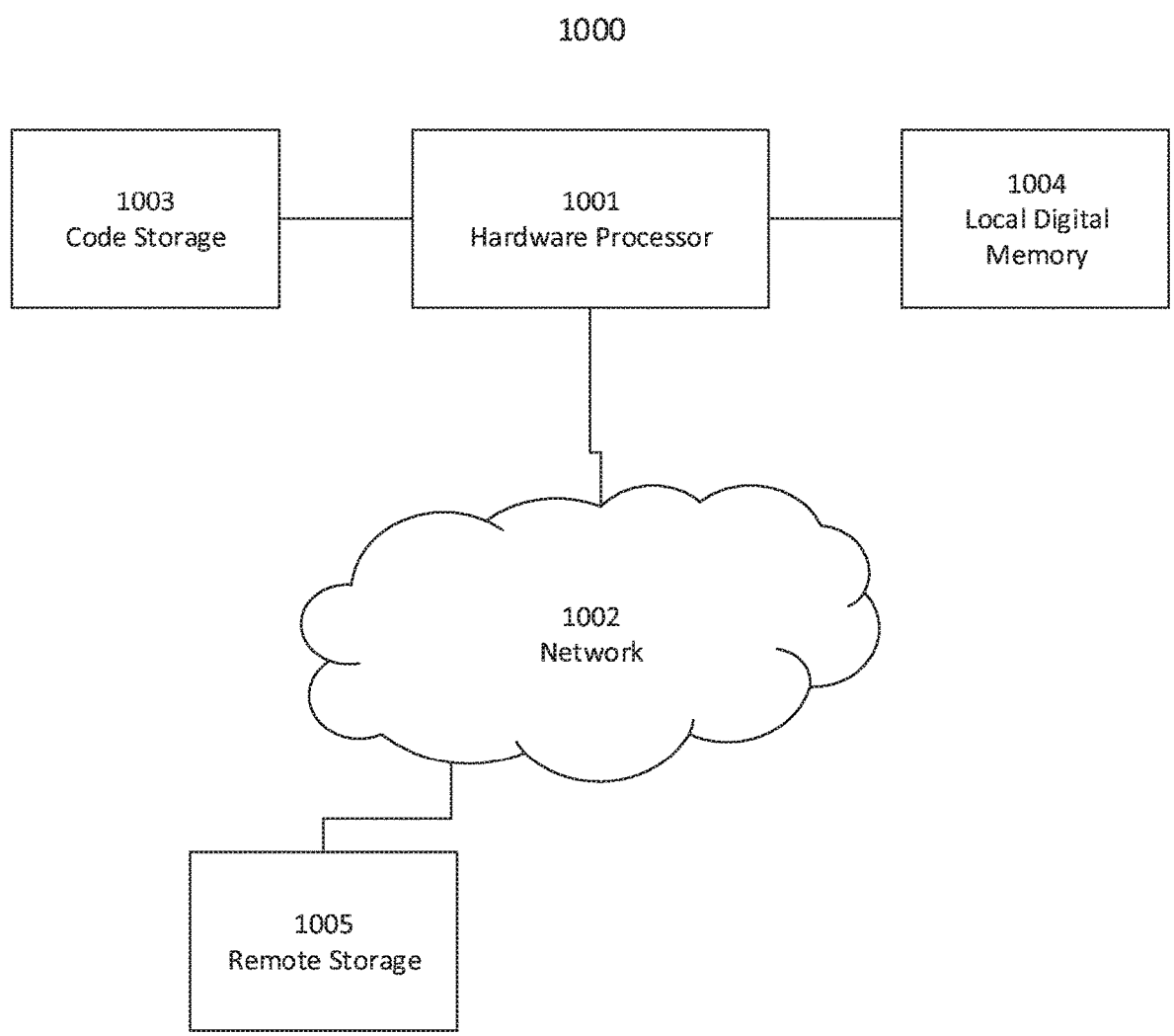
FIG. 9 is a schematic illustration of an exemplary system according to some embodiments of the present invention.

Referring now to FIG. 9, showing a schematic illustration of an exemplary system 1000 according to some embodiments of the present invention. In such embodiments, a hardware processor 1001 is electrically coupled with a code storage 1003 storing a code for selecting a digital content with highest valuation using triangular approximation of Bernoulli distributions. The hardware processor may be connected to a network 1002. The network may be a local area network (LAN) or a wide area network (WAN). In some embodiments the network is a wireless network such as WiFi or a cellular network. In some other embodiments the network is a wired network such as an Ethernet network.

In some embodiments of the present invention, the hardware processor is coupled with an additional local digital memory hardware 1004. In such embodiments, the code may instruct the hardware processor to store information about nodes in the local digital memory hardware. In some embodiments, the processor is connected via the network to a remote storage 1005. Optionally the remote storage is a server. In other embodiments the remote storage is a cloud storage service. In some embodiments having a remote server, the code may instruct the hardware processor to store information about nodes in the remote server.

In some embodiments the information about nodes is stored in at least one database. The at least one database may reside in the local digital memory hardware or in the remote storage. Optionally, historical samples are received via the network. In some other embodiments, historical samples are read from the code storage or from the local digital memory hardware.

In some embodiments of the present invention, there is a software program product for selecting a digital content using triangular approximation of Bernoulli distributions. In such embodiments, the software program product comprises a non-transitory computer readable storage medium and instructions for selecting a digital content using triangular approximation of Bernoulli distributions. The instructions may be executed by at least one computerized processor from the non-transitory computer readable storage medium.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant user action events, digital contents and device attributes will be developed and the scope of the term "user action event", "digital content" and "attribute" is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer-implemented method for generating digital content, comprising:

receiving a plurality of samples, each comprises a request having a plurality of values of a plurality of attributes describing structural or functional properties of a device, said sample associated with a success value for a Bernoulli distributed user action event having a campaign having one or more digital content, and a bid rate (BR) of said campaign;

clustering said plurality of samples in a plurality of homogenous sample groups according to respective said plurality of values;

identifying a group campaign with a highest valuation for each one of said plurality of sample groups using triangular approximation of the Bernoulli distribution of user action events in said sample group;

receiving a query from a device including a plurality of other values of said plurality of attributes describing structural or functional properties of said device, wherein said plurality of other values includes at least one certain value for one certain attribute describing a property of said device;

selecting one of said plurality of sample groups, wherein said selected sample group has a sample having said certain value of said certain attribute describing said property of another device;

selecting a digital content of said group campaign with highest valuation identified for said selected sample group; and generating, utilizing at least one hardware processor, advertising digital content in response to said query, including said selected digital content based on the highest valuation calculation.

2. The method of claim 1, wherein said selected digital content is an advertisement for the purpose of displaying or playing said advertisement on said device;

wherein said plurality of attributes are members of a group including: an identifier identifying a software application or web site running on said device, a country where said device is located, an identifier of an operating system running on said device, an operating system version identifier, a size of advertisement requested, a make of said device, a model of said device, a network connection type, a gender of a user, and a city where said device is located; and wherein said user action event is a member of a group including: a user clicking on a certain location in said software application or web site and said user installing another software.

3. The method of claim 1, wherein said identifying a group campaign with a highest valuation comprises:

generating a list of samples comprising all samples clustered in said sample group;
generating a list of events comprising all Bernoulli distributed user action events associated with said list of samples;
assuming for each one event in said list of events a conversion rate of said event in said list of samples (CVR);
producing a plurality of valuations by calculating for each one event in said list of events a valuation in said list of samples (EV), comprising:
using a confidence level ($\tau$);
applying numerical methods to find a possible conversion rate ($\theta$) such that the probability that said CVR is greater than or equal to said $\theta$ is equal to said $\tau$; and
multiplying said $\theta$ by said campaign's BR to compute said EV;
identifying a highest valuation of said plurality of valuations in said list of samples ($EV_{best}$);
producing a plurality of probabilistic scores by calculating a probabilistic score ($P_i$) for each one event in said list of events, comprising:
calculating a probability that said EV is greater than said $EV_{best}$ by using triangular approximation of the Bernoulli distribution of said one event in said list of events; and
associating said $P_i$ with said one event;
identifying a highest probabilistic score of said plurality of probabilistic scores;
choosing said campaign of said one event associated with said highest probabilistic score; and
associating said chosen campaign with said sample group.

4. The method of claim 3, wherein using triangular approximation of the Bernoulli distribution of said one event in said list of events comprises using an isosceles triangle centered around said $EV_{best}$, and having a base equaling four times the standard deviation of the distribution of said event and a height equaling the inverse of two times the standard deviation of the distribution of said event.

5. The method of claim 4, wherein said numerical methods include using a numerical solver.

6. The method of claim 1, wherein said clustering said plurality of samples in a plurality of homogenous sample groups according to respective said plurality of values comprises:
for each one of said plurality of samples:
choosing another at least one certain value of another at least one certain attribute describing a property of a device of said plurality of values;
selecting one of said plurality of sample groups, having another of said plurality of samples having said other at least one certain value of said other at least one certain attribute describing said property of another device; and
adding said sample to said selected sample group.

7. The method of claim 1, further comprising storing said plurality of sample groups in a storage.

8. The method of claim 7, wherein said storage is at least one database, said at least one database is a member of a group including: a local database and a remote database.

9. The method of claim 1, further comprising:
receiving another sample comprising a plurality of third values of said plurality of attributes describing said properties of a third device and associated with another success value for another Bernoulli distributed user action event, having a second campaign having one or more other digital content, and a second bid rate ($BR_i$) of said second campaign;
selecting another of said plurality of sample groups;
adding said other sample to said other sample group; and
identifying a new group campaign with a highest valuation using triangular approximation of the Bernoulli distribution of user action events in said other sample group.

10. The method of claim 9, wherein said identifying a new campaign with a highest valuation using triangular approximation of the Bernoulli distribution of user action events in said other sample group comprises:
generating a new list of samples comprising all samples clustered in said other sample group;
generating a new list of events comprising all Bernoulli distributed user action events associated with said new list of samples;
assuming for each one event in said new list of events a conversion rate of said one event in said new list of samples ($CVR_{new}$);
producing a plurality of new valuations by calculating for each one event in said new list of events a new valuation in said new list of samples ($EV_{new}$), comprising:
using another confidence level ($\tau_{new}$);
applying numerical methods to find a new possible conversion rate ($\theta_{new}$) such that the probability that said $CVR_{new}$ is greater than or equal to said $\theta_{new}$ is equal to said $\tau_{new}$; and
multiplying said $\theta_{new}$ by said second campaign's second bid rate $BR_i$;
identifying a new highest valuation of said plurality of new valuations in said new list of samples ($EV_{newbest}$);
producing a plurality of new probabilistic scores by calculating a new probabilistic score ($P_{inew}$) for each one other event in said new list of events, comprising:
calculating a new probability that said $EV_{new}$ is greater than said $EV_{newbest}$ by using triangular approximation of the Bernoulli distribution of said one other event in said new list of events; and
associating said $Pi_{new}$ with said one other event;
identifying a new highest probabilistic score of said new plurality of probabilistic scores;
choosing said second campaign of said one other event associated with said new highest probabilistic score; and
associating said chosen second campaign with said other sample group.

11. The method of claim 10, wherein said numerical methods include using a numerical solver.

12. A software program product for generating digital content, comprising:
a non-transitory computer readable storage medium;
first program instructions for receiving a plurality of samples, each comprises a request having a plurality of values of a plurality of attributes describing structural or functional properties of a device, said sample associated with a success value for a Bernoulli distributed user action event having a campaign having one or more digital content, and a bid rate (BR) of said campaign;
second program instructions for clustering said plurality of samples in a plurality of homogenous sample groups according to respective said plurality of values;
third program instructions for identifying a group campaign with a highest valuation for each one of said plurality of sample groups using triangular approximation of the Bernoulli distribution of user action events in said sample group;

fourth program instructions for receiving a query from a device including a plurality of other values of said plurality of attributes describing structural or functional properties of said device, wherein said plurality of other values includes at least one certain value for one certain attribute describing a property of said device;

fifth program instructions for selecting one of said plurality of sample groups wherein said selected sample group has a sample having said certain value of said certain attribute describing said property of another device;

sixth program instructions for selecting a digital content of said group campaign with highest valuation identified for said selected sample group; and seventh program instructions for generating advertising digital content in response to said query, including said selected digital content based on the highest valuation calculation;

wherein said first, second, third, fourth, fifth, sixth and seventh program instructions are executed by at least one computerized processor from said non-transitory computer readable storage medium.

13. A system for generating digital content, comprising:

at least one code storage storing a code;

at least one hardware processor coupled to said at least one code storage for executing said code for:

receiving a plurality of samples, each comprises a request having a plurality of values of a plurality of attributes describing structural or functional properties of a device, said sample associated with a success value for a Bernoulli distributed user action event having a campaign having one or more digital contents, and a bid rate (BR) of said campaign;

clustering said plurality of samples in a plurality of homogenous sample groups according to respective said plurality of values;

identifying a group campaign with a highest valuation for each one of said plurality of sample groups using triangular approximation of the Bernoulli distribution of user action events in said sample group;

receiving a query from a device including a plurality of other values of said plurality of attributes describing structural or functional properties of said device, wherein said plurality of other values includes at least one certain value for one certain attribute describing a property of said device;

selecting one of said plurality of sample groups, wherein said selected sample group has a sample having said certain value of said certain attribute describing said property of another device;

selecting a digital content of said group campaign with highest valuation identified for said selected sample group; and generating advertising digital content in response to said query, including said selected digital content based on the highest valuation calculation.

14. The system of claim 13, wherein said receiving a plurality of samples is by reading said plurality of samples from said code storage.

15. The system of claim 13, wherein said receiving a plurality of samples is via a network.

16. The system of claim 13, further comprising a local digital memory hardware electrically coupled to said at least one hardware processor.

17. The system of claim 16, wherein said receiving a plurality of samples is by reading said plurality of samples from said local digital memory hardware.

18. The system of claim 13, further comprising a remote storage, connected to said at least one hardware processor via a network.

19. The system of claim 18, wherein said receiving a plurality of samples is by reading said plurality of samples from said remote storage.

* * * * *